May 26, 1925. Re. 16,086

R. H. BURFEIND

NON-GROUNDED OR METALLIC LINE CIRCUIT SYSTEM

Original Filed April 18, 1907 3 Sheets-Sheet 1

—Inventor—
Raymond H. Burfeind
Chas. W. Candy
Atty.

May 26, 1925. Re. 16,086

R. H. BURFEIND

NON-GROUNDED OR METALLIC LINE CIRCUIT SYSTEM

Original Filed April 18, 1907 3 Sheets-Sheet 2

Inventor
Raymond H. Burfeind
Chas. M. Candy Atty.

May 26, 1925. Re. 16,086
R. H. BURFEIND
NON-GROUNDED OR METALLIC LINE CIRCUIT SYSTEM
Original Filed April 18, 1907 3 Sheets-Sheet 3
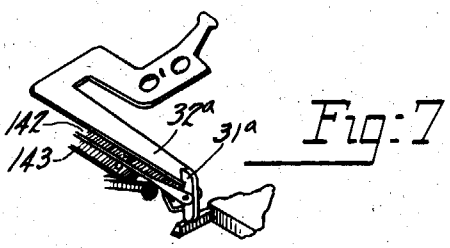
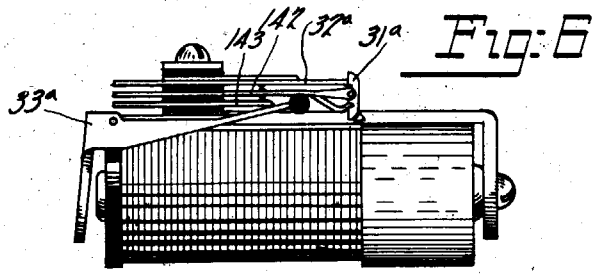
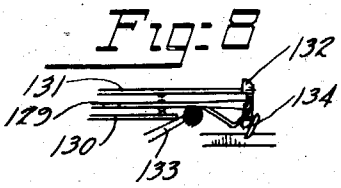
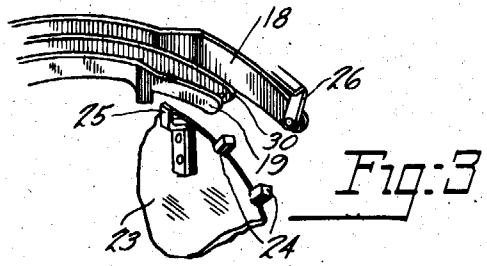
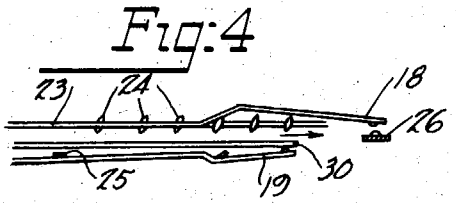
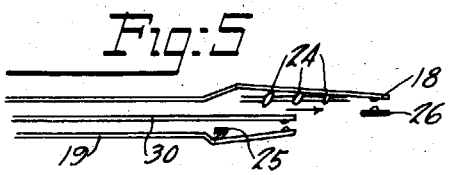
Inventor
Raymond H. Burfeind
Chas. W. Cady
Atty.

Reissued May 26, 1925.

Re. 16,086

UNITED STATES PATENT OFFICE.

RAYMOND H. BURFEIND, OF CHICAGO, ILLINOIS, ASSIGNOR, BY MESNE ASSIGNMENTS, TO AUTOMATIC ELECTRIC COMPANY, A CORPORATION OF ILLINOIS.

NONGROUNDED OR METALLIC LINE-CIRCUIT SYSTEM.

Original No. 1,299,119, dated April 1, 1919, Serial No. 369,021, filed April 18, 1907. Application for reissue filed August 30, 1920. Serial No. 407,038.

*To all whom it may concern:*

Be it known that I, RAYMOND H. BURFEIND, a citizen of the United States of America, and resident of Chicago, Cook County, Illinois, have invented a certain new and useful Improvement in Nongrounded or Metallic Line-Circuit Systems, of which the following is a specification.

My invention relates to automatic telephone systems in which means are provided for enabling a calling subscriber to extend his line into connection with the line of the called subscriber, or into connection with some other line, without the aid of operators.

The principal object of my invention is the provision of an improved system in which the apparatus at the exchange or central station may be controlled by the calling subscribers, for the purpose of establishing connection with the lines of the called subscriber, or for the purpose of disconnecting and restoring the automatic switches after the subscribers are through talking, without employing operating grounds at the substations—that is to say, without employing ground circuits between the substations and the central station.

It is also an object, of course, to provide certain details and features of improvement and combinations tending to increase the general efficiency and serviceability of an automatic telephone exchange system of this particular character.

In application No. 369,013, filed April 18, 1907, by A. E. Keith for improvement in non-grounded or metallic circuit systems, a system is shown in which the switches are operable without the necessity of using ground connections at the subscribers' stations. Also, in application Serial No. 369,-012, filed April 18, 1907, by E. A. Mellinger, a system is shown in which a plurality of automatic switches are successively controllable or operable without using grounds at the substations, and these switches are also releasable in the same manner. My present invention is, therefore, in the nature of an improvement on the systems thus disclosed in the said prior Keith and Mellinger applications.

In the accompanying drawings, Figures 1 and 2 taken together represent diagrammatically a calling substation A connected by means of central office switching apparatus with a called substation A′, in a system embodying the principles of my invention. The switches, through which the stations A and A′ are shown connected, comprise, in Fig. 1, the so-called first-selector C and second-selector D; and in Fig. 2, a connector E and a first selector C′ similar to the first-selector C. The selector C is individual to the line of the substation A, while the first-selector C′ is individual to the line of the substation A′, #2220. The said selectors C and C′ are substantially the same in construction. For operating the central office switches there is provided a central source of current or battery B having its positive terminal preferably grounded at G (Fig. 2).

Figs. 3, 4 and 5 are detail views of the substation impulse springs.

Figs. 6, 7 and 8 are detail views of the release relays of the selector and connector switches.

Figure 1:
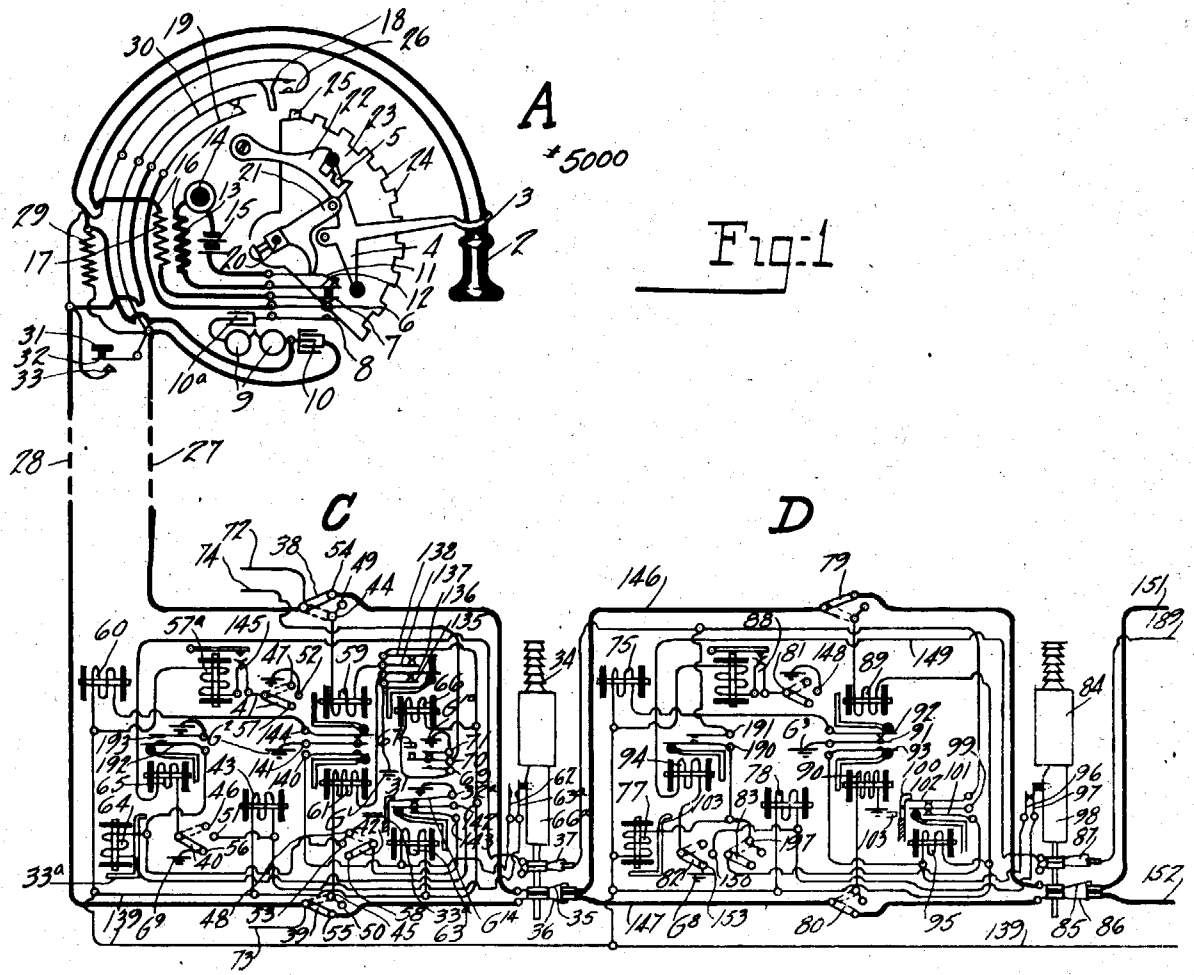

It will be understood, of course, that in this system the first-selectors are arranged in groups, as well as the second-selectors and the connectors. A somewhat common arrangement is to divide the substations into groups of one hundred, and to, of course, divide their allotted selectors into corresponding groups. Furthermore, every group of first-selectors has allotted to it a group of second-selectors for every bank level. Through the medium of the second-selectors the connectors of various hundred-groups are reached. The connectors and second-selectors are less in number than the subscribers—that is, they are employed on a percentage basis. The substation A may be of any suitable or approved type. The one in connection with which I have elected to illustrate my invention comprises a receiver 2, switch-hook 3 for controlling the substation circuits, which controlling operations are accomplished through the medium of any suitable means, such as the cam-arms 4 and 5. When the switch-hook is down, the cam-arm 4 carries the spring 6 out of engagement with the spring 7 and into engagement with the spring 8, thereby bridging the ringer 9 in series with the condensers 10 and 10ª across the line. Furthermore, when the switch-hook is down the said cam disengages the springs 11 and 12, thus breaking the local circuit which includes in series the primary winding 13, transmitter 14 and local battery 15. The said substation comprises the usual induction-coil 16 having the primary winding 13 and secondary winding 17. Being an automatic substation it is provided with the usual vertical and rotary impulse springs 18 and 19. Said substation is, of course, provided with a dial, which is not shown but which is secured to the shaft 20, together with the locking dog 21. Furthermore, there is a locking cam 22 that locks the dog 21, while the receiver is on the switch-hook, to prevent a rotation of the dial. For operating the impulse springs 18 and 19 (Fig. 3) the substation is provided with an impulse wheel 23 that is secured to the shaft 20, which impulse wheel carries on its periphery the so-called vertical impulse teeth 24 and one rotary impulse tooth 25. The said impulse teeth are so arranged that when the dial is drawn down the impulse springs 18 and 19 are not operated; but as the dial returns, first the vertical teeth engage the vertical impulse spring 18 (Fig. 4) and after they have completed their work the rotary impulse tooth 25 operates the rotary impulse spring 19 (Fig. 5). In this operation the vertical impulse spring 18 is pressed into contact with the spring 26, whereby the vertical line conductor 27 becomes connected directly with the rotary line conductor 28. Normally, when the receiver is removed, the vertical and rotary line conductors 27 and 28 are connected through the high resistance coil 29. After the vertical impulse teeth have operated the vertical impulse spring 18, the rotary impulse tooth 25 momentarily disengages the springs 19 and 30, whereby the line conductors 27 and 28 become separated; and when the springs engage, the line conductors 27 and 28 are again connected through the coil 29. It will be clear from the drawings that when the subscriber rotates the dial the rotary impulse tooth 25, upon returning or rotating in a counter-clockwise direction, meets the angled member shown on the end of the spring 19, pressing, as it advances, both springs 19 and 30 out of the way, but without breaking connection. However, when the dial returns toward normal position the rotary impulse tooth 25 comes in behind the member on the end of the spring 19, flexing the said spring 19 away from the spring 30, thus breaking the circuit as described. It will be understood, furthermore, that the shaft 20 is provided with a spring adapted to restore the dial when once it has been rotated out of normal position. Furthermore, the switch hook 3 is also provided with any suitable spring whereby said switch hook may be caused to rise when the weight of the receiver 2 is removed. The means whereby the subscriber may signal the called subscriber comprises the push-button 31, which, when pressed, carries the spring 32 into engagement with the contact point 33, whereby the line conductors 27 and 28 are connected.

The first-selector switch shown at C may be of any suitable or approved type, for instance of the general type described in United States Patent No. 815,321, granted March 13, 1906, to Keith, Erickson & Erickson. Among other details, it embodies the following well-known devices and circuits: The switch shaft 34 carries the vertical and rotary wipers 35 and 36, respectively, and the private wiper 37. The side switch is well known and comprises the side switch wipers 38, 39, 40, 41 and 42, which may be designated as the vertical, rotary and private side switch wipers, the rotary magnet wiper and release relay wiper, respectively. The side switch is under the control of the private magnet 43, and when the side switch is in normal or first position the wipers 38, 39, 40, 41 and 42 occupy the contact points 44, 45, 46, 47 and 48, respectively. In the second position they rest on the contact points 49, 50, 51, 52 and 53, respectively, and in third position the contact points 54, 55, 56, 57 and 58 are engaged by their respective wipers. Through the medium of the vertical line relay 59, and while the side switch is in first position, the subscriber controls the vertical magnet 60, which latter operates to raise the switch shaft 34 and wipers 35, 36 and 37 vertically. By means of the rotary line relay 61, and before the shaft has rotated to disengage the springs 62 and 63[a], the subscriber controls the private magnet 43, and, therefore, the side switch. While the side switch is in second position the rotary magnet 57[a], which operates to carry the switch shaft and wipers 35, 36 and 37 in a rotary direction, is energized. The relay 63 provides the means whereby the subscriber controls the release magnet 64 while the side switch is in the first or second position, and while the switch shaft is off normal. If, while the side switch of the selector C is in first or second position, the relay 63 is energized, and the spring 142, upon the end of which there is a latch 31[a] (Fig. 6), is carried out of engagement with the spring 143 and into engagement with the spring 32[a], the latch 31[a] then falls over the end of the spring 32[a] and locks the two springs 32[a] and 142 in contact (Fig. 7). Now, when the relay 63 deenergizes, the two locked springs 32[a] and 142 are carried into engagement with the spring 143; then when the release magnet 64 energizes, the armature 33[a] is attracted and moves the latch 31[a] in such manner that it turns about its pivot points on the end of the spring 142 and unlocks the springs 142 and 32ᵃ, whereby the two springs disengage. If the side switch passes to the third position, then since the selector C is of the trunk-release type, the selector is controlled through the next switch, and a connection with the latter is then established through the private wiper 37 and by means of the back-release relay 65. The bridge-cut-off relay 66 is provided to open the connection between the line relays 59 and 61 and the battery terminals. It will be noticed that the vertical line relay 59 is connected to the non-grounded terminal, and that the rotary line relay 61 is connected to ground. This disconnection is desirable, because if the relays are not disconnected from battery, the ringing current for signaling the subscriber may then operate either or both of the relays 59 and 61 and cause some interference with the switch. It is also desirable to remove the bridge formed through the said relays from across the line so as to give the voice-currents as clear a path as possible. Furthermore, the shaft 34 is provided with the cam 66ᵃ which, when the shaft is in normal position, permits the springs 62 and 63ᵃ to disengage; but on the first vertical step of the shaft 34 the cam 66ᵃ presses the said springs into engagement. Now when the shaft is given a rotary step the cam 66ᵃ is carried out of engagement with the spring 63ᵃ, and the springs 62 and 63ᵃ disengage. The switch-shaft is provided with a normal arm 67 which, when the shaft is given a vertical impulse, permits the spring 70, which normally engages the spring 68, to pass into contact with the spring 71.

The second selector D is similar to the first selector C, with the exception that there are no normal conductors, such as the normal conductors 72 and 73. Since there is no use for such conductors they are omitted. There is also no utility in the second selector for a bridge cut off relay, such as the relay 66 of the selector C, and this is also omitted, and the line relays are connected directly to the battery terminals. The private normal conductor, such as the private normal conductor 74 of the selector C, is of no use in connection with the second selector and is also omitted. Since like parts are similarly represented throughout the drawings, the vertical magnet 75 and the rotary magnet 76, the release magnet 77 and the private magnet 78 will be recognized and understood. The said private magnet 78, of course, controls the side switch wipers 79, 80, 81, 82 and 83. The vertical movement of the switch shaft 84 and, therefore, of the wipers 85, 86 and 87, is controlled by the vertical magnet 75, and the rotary movement by the rotary magnet 76, the rotary magnet circuit being provided with the usual interrupter springs 88. The operative magnets of the switch are, of course, controlled by the subscriber through the medium of the vertical and rotary line relays 89 and 90, as is well known. Said relays have under their control the usual springs 91, 92 and 93. The selector D is also provided with a release relay 94 for controlling the release of the switch when the side switch passes to third position. The relay 95 controls the energizing circuit of the release magnet 77 while the side switch is in first and second positions and the shaft is off normal. The release controlling relay 95 in the second-selector operates in the same manner as the release relay 63 of the first-selector. If, while the said switch of the selector D is in first or second position, the relay 95 is energized, and the spring 99, upon the end of which there is a latch 100, is carried out of engagement with the spring 101 and into engagement with the spring 102, the latch 100 then falls over the end of the spring 102 and locks the two springs 102 and 99 in contact with each other. Now when the relay de-energizes, the two locked springs are carried into contact with the spring 101. Then when the release magnet 77 energizes, the armature 103 is attached and moves the latch 100 in such manner that it turns about its pivot points on the end of the spring 99 and unlocks the springs 99 and 102, whereby the two springs disengage. The cam springs 96 and 97 are controlled by the shaft cam 98, in the same manner in which the cam springs of the selector C are controlled.

The connector switch E may also be of any suitable or approved type, for instance of the general type described in United States Patent No. 815,176, granted March 13, 1906, to Keith, Erickson & Erickson. The mechanical details of the first-selector and connector, as is well known, are very much the same. The connector switch shaft 104, like the first-selector switch shaft, carries the line wipers 105 and 106 and the private wiper 107. The connector switch is also controlled by the calling subscriber through the medium of the vertical and rotary line relays 108 and 109. The vertical line relay directly controls the vertical magnet 110, and also the rotary magnet 111 and the ringer relay 112. The office of the vertical magnet 110 is to give the shaft and shaft wipers their vertical motion, and the rotary magnet 111 imparts to the shaft and shaft wipers a rotary or circular motion. The rotary line relay 109 controls the energizing circuit of the release relay 113. The release relay 113 is similar to the relay 95 of the second-selector, and when the relay 113 is energized the spring 129 is shifted out of engagement with the spring 130 and into engagement with the spring 131 (Fig. 8). The latch 132 then locks the two springs in contact, and when the relay de-energizes, the locked springs 129 and 131 are carried into contact with the spring 130; but as the armature 133 nears its normal position, the latch 132 comes into contact with the beveled member 134, whereby the latch 132 gradually slides from the end of the spring 131; and when the said spring is unlocked it returns to normal position, out of engagement with the spring 129. The private magnet 114 is controlled by the vertical line relay 108, and under certain conditions controls the release magnet 120 and also the side switch wipers 115, 116, 117, 118 and 119. The side switch of the connector, like the side switch of the first-selector, has a normal or first position, a second position and a third position. The release magnet 120 is also controlled by the relay 121. By the condensers 122 and 123 the circuit through the connector is divided into two sections. The central office is equipped with busy-signaling apparatus of any suitable design, as, for example, the one comprising an interrupter 122ᵃ in series with the primary winding 123ᵃ of the induction-coil 124, whereby a busy-signaling current is induced in the secondary winding 125 of the said coil. The connector switch shaft 104 also carries a normal post arm 126 which, when the connector shaft is off normal, allows the spring 127 to engage the contact point 128, whereby the busy-signal may be transmitted to the rotary line conductor.

The substation A′ is like the substation A; also, the first-selector switch C′ allotted to the line #2220 is like the first-selector C allotted to the line #5000.

A clearer understanding of my improved system may be had from an explanation of the operation of the central office switches when one subscriber calls another. Suppose, for an example, that the subscriber at substation A desires to communicate with the subscriber at substation A′ on the line #2220. The operation of the central office switches, to bring about this connection, is as follows: When the subscriber at substation A removes the receiver 2 from the switch-hook 3 the cam-arm 4 permits the springs 7 and 6 to engage, whereby a series circuit including the vertical line relay 59 of the selector C, resistance-coil 29 of the substation A, and the rotary line relay 61 of the selector C is closed. This circuit extends from ground G′ at the selector C through the springs 135 and 136, through the rotary line relay 61, contact point 45, side switch wiper 39, rotary line conductor 28, through the springs 30 and 19, springs 6 and 7, secondary winding 17, receiver 2, through the resistance-coil 29 to the vertical line conductor 27, side switch wiper 38, contact point 44, vertical line relay 59, springs 137 and 138 to the battery lead 139, thence through battery B and to ground G. The rotary line relay 61 is so adjusted that the current-flow is sufficient to operatively energize the said relay, while the vertical line relay 59 is so adjusted that the current-flow in this circuit is not sufficient to operatively energize it. The rotary line relay, upon energizing, places the springs 140 and 141 in contact. This closes a circuit through the release controlling relay 63. The circuit through the release controlling relay extends from ground G² through the springs 141 and 140, through the relay 63 to the battery lead 139, thence through battery B and to ground G. This relay, upon energizing, separates the springs 142 and 143, and places the spring 142 in contact with the spring 32ᵃ. When the dial is rotated for the first digit 2 the spring 18 is twice pressed into contact with the spring 26. By this operation the line conductors 27 and 28 are directly connected, shunting or short-circuiting the resistance-coil 29; thus a new circuit, which does not include the resistance-coil 29, is established through the vertical and rotary line relays 59 and 61 of the selector C. Sufficient current now flows in the circuit to operatively energize the vertical line relay 59, which latter, upon energizing, presses the springs 144 and 141 into contact, which closes an energizing circuit through the vertical magnet 60. This circuit extends from ground G² through the springs 141 and 144, through the vertical magnet 60 to the battery lead 139, thence through battery B and to ground G. The springs 18 and 26 being twice pressed into contact for the first digit, the vertical line relay 59 is twice operatively energized, and the vertical magnet is in turn energized twice. By this operation of the vertical magnet the shaft 34 and the shaft wipers 35, 36 and 37 are raised two steps and brought opposite the second bank level. It should be borne in mind that at the first vertical step of the switch shaft the cam 66ᵃ operates to close in contact the normally open shaft springs 62 and 63ᵃ. As soon as the said springs 62 and 63ᵃ come into contact an energizing circuit is established through the private magnet 43 from ground G² at the selector C, through the springs 141 and 140, through the cam springs 62 and 63ᵃ to the private magnet 43, thence through said magnet to the battery lead 139, and through battery B to ground G. Furthermore, at the same first vertical step the normal post arm 67 disengages from the spring 70, permitting the latter to leave the spring 68 and to engage with the grounded spring 71. This operation, of course, disconnects the private normal conductor 74 from the bridge-cut-off relay 66 and places a guarding potential on said private normal conductor from ground $G^{10}$ to prevent any calling subscriber from calling in upon the line #5000 after the switch C has been operated. The rotary impulse tooth 25 separates the springs 19 and 30, which open the circuit including the vertical and rotary line relays and resistance-coil 29. The rotary line relay 61, being deprived of its energizing current, de-energizes and permits the springs 141 and 140 to separate, whereby the energizing circuit of the private magnet 43 is broken, and the side switch is permitted to pass to second position. As soon as the impulse tooth 25 disengages from the spring 19, the springs 19 and 30 again come into contact, and again the energizing circuit through the rotary line relay is established. In the meantime, however, the circuit through the release controlling relay 63 is broken, but the relay being a slow-acting relay sufficient residual magnetism is retained in the core to maintain the relay in an operated position until this energizing circuit is again established, when the rotary line relay energizes. When the side switch passes to second position an energizing circuit is established through the rotary magnet $57^a$. This circuit extends from the grounded contact point 52 through the side switch wiper 41, interrupter springs 145, rotary magnet $57^a$ to the battery lead 139, thence through battery B and to ground G. The rotary magnet, upon energizing, operates to carry the shaft wipers in a rotary or circular direction. The rotary magnet being energized, the shaft wipers 35, 36 and 37 are carried one step and into engagement with the bank contacts that constitute the terminal of the trunk line leading to the selector switch D, assuming that the trunk leading to the said selector leads off from the first set of contacts of the second level; but if the first trunk line is busy some other selector (similar to the selector C) in the exchange will be resting in engagement with said trunk line, and the first private bank contact of the second level will be found connected to ground, as is usually the custom in systems of this general character. Therefore, when the selector shaft is rotated one step an energizing circuit is established through the private magnet 43, when the private wiper 37 strikes the grounded private bank contact, thereby retaining the side switch in second position and maintaining the energizing circuit through the rotary magnet $57^a$. The rotary magnet, by intermittent magnetization, thus causes the shaft to rotate step by step and carry the private wipers past the last busy trunk line. However, as soon as the private magnet is deenergized the side switch is tripped into third position; but if there are no busy contacts to be passed over, as assumed in the first instance, the private magnet 43 trips the side switch to third position, with the result that the side switch wipers engage their respective contact points. When the side switch wipers 38 and 39 pass to third position the subscriber's line conductors 27 and 28 are extended to the conductors leading to the selector switch D; also, since the side switch wiper 40 engages a grounded contact point 56, a guarding potential is established at the private wiper 37 for protecting the seized trunk line from being molested by any other switch. It will be noticed that after the side switch passes to third position the relay 63 deenergizes, and the springs $32^a$ and 142 engage with the spring 143, but the engagement of the said springs at this particular time is without effect, since the side switch wiper 42 has passed to third position and engaged the idle contact point 58. Furthermore, when the shaft 34 is given the first rotary step the cam $66^a$ passes out of engagement with the spring $63^a$ and permits the springs 62 and $63^a$ to disengage. This disengagement breaks the energizing circuit formed by the rotary line relay through the private magnet 43 and leaves the control of the latter to the guarding potential (when the side switch wiper 40 is in second position) on the private bank contacts which are engaged by the private wiper 37. The second digit is called after the subscriber has established connection with the selector D by way of the trunk conductors 146 and 147.

When the trunk conductors 146 and 147 are seized an energizing circuit is established through the vertical and rotary line relays 89 and 90 of the selector D, in the same manner in which the circuit was established through the vertical and rotary line relays of the selector C. The rotary line relay 90 energizes and closes an energizing circuit through the release relay 95. The circuit through the release relay extends from ground $G^3$ through the springs 91 and 93, through the relay 95 to the battery lead 139, thence through battery B and to ground G. The relay 95 energizes and locks the springs 99 and 102 in contact, as explained. The subscriber rotates the dial, as described, for the second digit 2, thereby shunting or short-circuiting the resistance-coil 29 when the springs 18 and 26 engage. The vertical line relay 89 now operatively energizes and places the springs 91 and 92 in contact, whereby a circuit is closed through the vertical magnet 75, said circuit extending from ground $G^3$ through the springs 91 and 92, through the magnet 75 to the battery lead 139, thence through battery B and to ground G. Each time that the vertical magnet is energized it operates to raise the shaft and shaft wipers one step at a time until the said wipers are carried two steps and brought opposite the level in which are located the terminals of the trunk conductors 151 and 152 leading to the connector switch E. In the manner described in connection with the selector C when the switch shaft 84 of the selector D moves up the first step, the cam 98 presses the cam springs 96 and 97 into contact, whereby an energizing circuit is set up through the private magnet 78. This energizing circuit extends from ground $G^3$ through the line relay springs 91 and 93, through the cam springs 96 and 97 to the private magnet 78, thence to the battery lead 139, and through battery B to ground G. When the rotary impulse tooth separates the springs 19 and 30 the energizing circuit through the rotary line relay 90 is interrupted, and the said relay restores the springs 91 and 93 to normal position, which breaks the energizing circuit through the private magnet 78 and the release relay 95. The private magnet, upon deenergizing, permits the side switch to pass from first to second position. The release relay 95 being slow-acting, however, the rotary impulse tooth 25 disengages from the spring 19, and the energizing circuit of the rotary line relay is again established, and the springs 93 and 91 again engage, closing the circuit through the release relay 95 before the armature of said relay has time to fall back. When the side switch wiper 81 engages the grounded contact point 148 an energizing circuit is established through the rotary magnet 76. This circuit extends from the grounded contact point 148 through the side switch wiper 81, interrupter springs 88, rotary magnet 76 to the battery lead 139, thence through battery B to ground G. The rotary magnet, by intermittent energization, operates to rotate the shaft and shaft wipers step by step and carry the wipers past the last busy trunk line, if any such are found, as described in connection with selector C. When the wiper 87 disengages from the last busy trunk line the energizing circuit extending from the grounded private contact to the private wiper 87, conductor 149, through the release relay 94, side switch wiper 82, contact point 150, through the private magnet 78 to the battery lead 139, and through battery B to ground G, is then broken, and the side switch passes to third position, thus extending the subscriber's line conductors 27 and 28 to the conductors 151 and 152 which lead to the connector switch E. Also, since the side switch wiper 82 engages the grounded contact point 153, a guarding potential is established at the private wiper 87 for protecting the seized trunk line from being molested by any other switch. Of course, when the side switch passes to third position and the energizing circuit is broken through the line relays 89 and 90, the energizing circuit is, as a result, also broken through the release relay 95, which relay then permits the springs 102, 99 and 101 to come into contact. The coming into contact of these springs when the side switch is in third position is of no consequence, since the side switch wiper 83 maintains the release circuit open at the time. Since the subscriber's line conductors 27 and 28 are now extended to the connector E, a circuit is established through the vertical line relay 108, resistance relay 29 at the substation A, rotary line relay 109 of the connector E. It will be noticed that in each instance when the subscriber's vertical and rotary line conductors 27 and 28 are extended to the next switch a new energizing circuit is established through the line relays of the new switch and through the substation resistance coil 29. At the same time, of course, the old energizing circuit through the line relays of the preceding switch is broken. The subscriber's conductors 27 and 28 having been extended to the connector E the rotary line relay 109 operates and places the springs 154 and 155 in contact, which closes a circuit through the releasing relay 113. This circuit extends from ground $G^4$ through the springs 154 and 155, through the winding of the relay 113 to the battery lead 139, thence through battery B and to ground G. The relay 113 now operates to lock the springs 131 and 129 in contact, by means of the latch 132, as explained. The subscriber operates the dial for the third digit 2, thereby energizing the vertical line relay 108 twice and de-energizing the rotary line relay 109 once. The current for energizing the vertical line relay flows from ground $G^5$ through the rotary line relay 109 to the trunk conductor 152, shaft wiper 86, side switch wiper 80, conductor 147, shaft wiper 36, rotary conductor 28, springs 26 and 18 to the vertical line conductor 27, side switch wiper 38, shaft wiper 35, conductor 146, side switch wiper 79, shaft wiper 85, conductor 151 to the vertical line relay 108, thence to the battery lead 139, and through battery B to ground G. Each time that the vertical line relay is energized the line relay springs 156 and 154 are pressed into contact, thereby closing an energizing circuit through the vertical magnet 110; also, the spring 157 is pressed into contact with the ground spring 154, whereby the energizing circuit is established through the private magnet 114. The circuit through the vertical magnet extends from ground $G^4$ through the springs 154 and 156, side switch wiper 117, through the vertical magnet 110 to the battery lead 139, thence through battery B and to ground G. Each time that the vertical magnet is energized it operates to raise the shaft and shaft wipers one step at a time until the said wipers are carried up two steps and brought opposite the level in which are located the terminal contacts of the line #2220. The circuit through the private magnet 114 extends from ground $G^4$ through the springs 154 and 157 to the side switch wiper 118, through the private magnet 114 to the battery lead 139, thence through battery B and to ground G. The private magnet, upon energizing, closes the springs 158 and 159 in contact, thereby closing a circuit which locks the private magnet in an operated position. This locking circuit extends from ground $G^4$ through the springs 154 and 155, springs 158 and 159, through the winding of the private magnet 114 to the battery lead 139, and through battery B to ground G. When the rotary line relay 109 deenergizes, due to the rotary impulse, the locking circuit through the private magnet 114 is broken. The private magnet now deenergizes and permits the side switch to pass to second position, thus placing the side switch wipers 115, 116, 117, 118 and 119 in connection with their respective contact points in second position. During the time in which the rotary relay 109 is deenergized the releasing relay 113 is maintained in its operated position by the residual magnetism. The last digit being naught the subscriber energizes the vertical line relay 108 ten times and deenergizes the rotary line relay 109 once. However, when the line relay springs 156 and 154 engage, a circuit is thereby closed through the rotary magnet 111 instead of through the vertical magnet 110. The energizing circuit extends from ground $G^4$ through the springs 154 and 156, side switch wiper 117 to the rotary magnet 111, thence to the battery lead 139, and through battery B to ground G.

Figure 2:
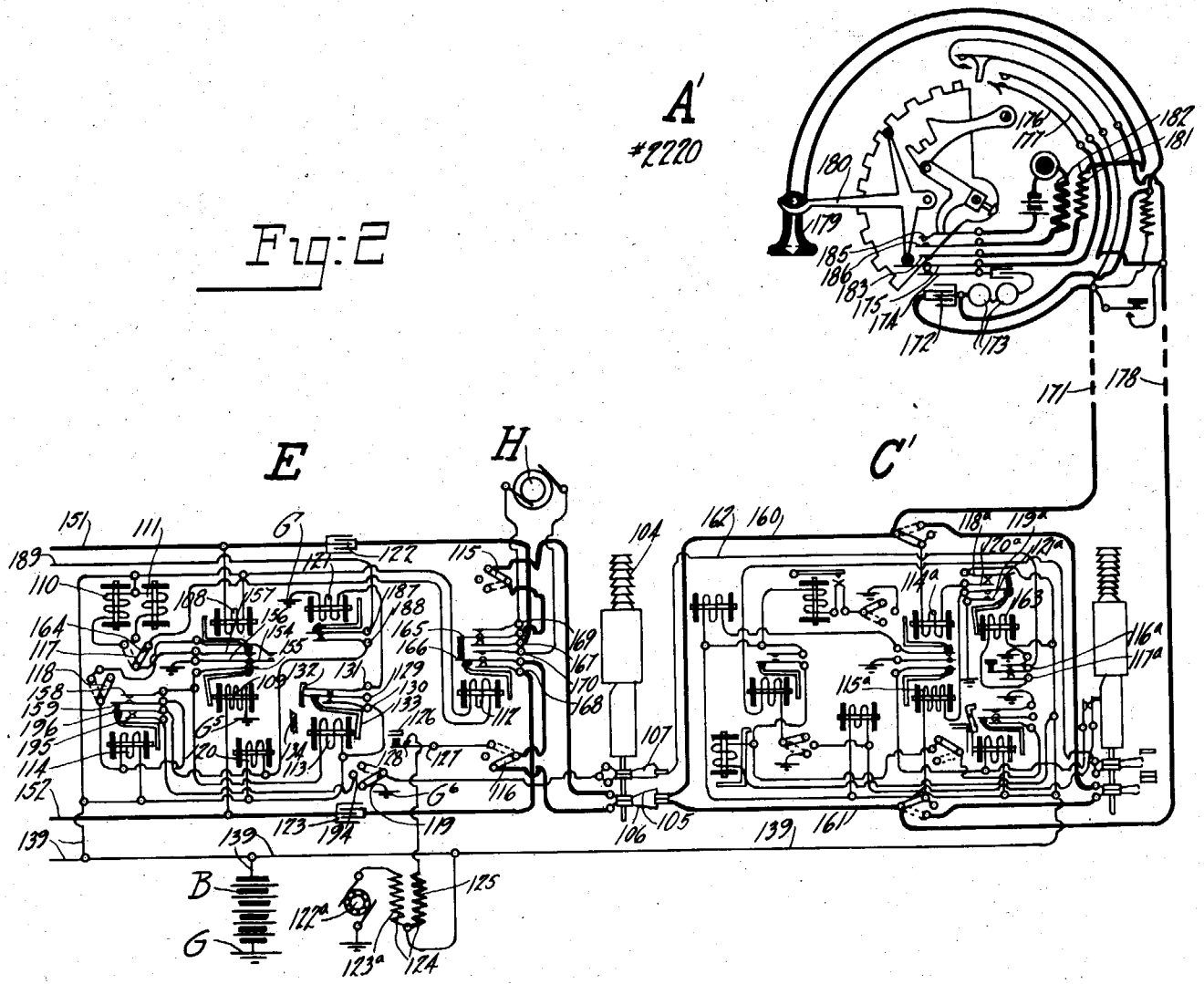

Each time that the rotary magnet is energized it rotates the shaft and shaft wipers 105, 106 and 107 one step at a time until the said wipers are carried into engagement with the normal conductors 160, 161 and 162, the first two of which lead to the line terminals of the desired subscriber. Also, when the vertical line relay 108 energizes, the spring 157 is pressed into contact with the spring 154, thus again closing an energizing circuit through the private magnet 114 which again operates and locks itself in an operated position. The deenergization of the rotary line relay 109, when the rotary impulse tooth 25 separates the springs 19 and 30, causes the locking circuit of the private magnet 114 to be again interrupted. The private magnet deenergizes, and one of two results occurs, namely the release of the side switch from second to third position, or the so-called busy-release of the connector, which will be disclosed hereinafter. Suppose the former result to occur and the side switch to pass to third position, thus placing the side switch wipers 115, 116, 117, 118 and 119 in contact with their respective contact points in third position. Then, when the side switch passes to third position a guarding potential is established for protecting the called line. This potential extends from ground $G^6$ through the side switch wiper 119 to the shaft wiper 107 which engages the private contact of the called line. The said guarding potential also closes an energizing circuit through the cut-off relay 163 of the first-selector C′, thereby removing the bridge formed by the rotary and vertical line relays $114^a$ and $115^a$ of the selector C′. The energizing circuit for the relay 163 may be traced from ground $G^6$ to the private wiper 107, thence through the private normal conductor 162, switch shaft springs $116^a$ and $117^a$ to the bridge-cut-off relay 163, thence to the battery lead 139 and through battery B to ground G. Of course, when the relay 163 energizes it separates the springs $118^a$ and $119^a$ from the springs $120^a$ and $121^a$, thereby disconnecting the relays $114^a$ and $115^a$ from the battery terminals. To signal the called subscriber, the calling subscriber presses the signaling button 31, whereby the spring 32 is placed in contact with the contact point 33, as a result placing in direct connection the vertical and rotary line conductors 27 and 28. This now causes an increase of current-flow through the connector vertical line relay 108. It will be remembered that the connector side switch has passed from second to third position, and that the side switch wiper 117 is in engagement with the contact point 164, thereby placing the vertical line relay 108 in control of the ringer relay 112, in the same manner in which the rotary magnet 111 came under the control of the vertical line relay 108 when the side switch passed from first to second position. Therefore, when the vertical line relay 108 presses the springs 154 and 156 into contact the ringer relay 112 is energized by a flow of current from ground $G^4$ through the springs 154 and 156, side switch wiper 117, contact point 164, ringer relay 112 to the battery lead 139, and from battery B to ground G. The ringer relay, upon energizing, shifts the springs 165 and 166 out of contact with the springs 167 and 168 and into engagement with the springs 169 and 170. This results in separating the calling subscriber's line from the called subscriber's line, and in bridging across the line of the latter the terminals of the ringer generator H. The signaling current is, therefore, sent from the ringer generator H to the ringer generator springs 169 and 165, side switch 115, shaft wiper 105, normal conductor 160, vertical conductor 171, condenser 172, ringer 173, springs 174 and 175, rotary impulse springs 176 and 177 to the rotary line conductor 178, normal conductor 161, shaft wiper 106, side switch wiper 116, ringer relay springs 166 and 170, back to the generator H. As soon as the calling subscriber ceases to press the signaling button 31 of the ringer relay 112 becomes deenergized, and the springs 165 and 166 resume their normal position in contact with the springs 167 and 168. The subscriber A′, in response to the signal, removes the receiver 179 from the switch hook 180, thereby removing the ringer 173 from across his line and bridging, instead, the secondary circuit which includes the receiver 179, the secondary winding 181 of the induction coil 182, secondary springs 183 and 175 and rotary impulse springs 176 and 177. The local transmitter circuit is closed as soon as the springs 185 and 186 engage in contact. The two substations #5000 and #2220 are now connected over the circuit shown by heavy lines in Figs. 1 and 2.

The release of the central office apparatus occurs when the calling subscriber restores the receiver 2 to the switch hook 3, thereby breaking the connection between the springs 6 and 7 at the substation, whereby the energizing circuit through the rotary line relay 109 of the connector E is broken—that is, the line conductors 27 and 28 are disconnected. The rotary line relay 109 of the connector E, upon deenergization, permits the springs 154 and 155 to disengage, thereby breaking the circuit through the releasing relay 113. The releasing relay 113 in turn deenergizes and places the locked springs 131 and 129 in contact with the spring 130, thereby closing an energizing circuit through the release relay 121. This circuit extends from ground $G^7$ through the relay 121, springs 131, 129 and 130 to the battery lead 139, and through battery B to ground G. As the relay armature 133 returns to normal position the latch 132 slides upon the beveled member 134 and unlocks the springs 131 and 129, as previously explained. The relay 121, upon energizing, closes the springs 187 and 188 in contact, whereby a series circuit is closed through the release relay 94 of the selector D and release magnet 120 of the connector E. This circuit extends from ground $G^8$ at the selector D to the contact point 153, side switch wiper 82, release relay 94, conductor 149, private shaft wiper 87, conductor 189, through the springs 187 and 188, release magnet 120 to the battery lead 139, and through battery B to ground G. The release magnet 120, being thus supplied with current, energizes and operates in the well-known manner to restore the connector shaft and shaft wipers to their normal position. The release relay 94 of the selector D also energizes and places the springs 190 and 191 in contact, whereby a circuit is completed through the release magnet 77 of the selector D in series with the release relay 65 of the first-selector C. This circuit extends from ground $G^9$ at the selector C through the side switch wiper 40, release relay 65, private wiper 37, release relay springs 191 and 190, through the winding of the release magnet 77 to the battery lead 139, and through battery B to ground G. The release magnet 77 in turn operates to release the second-selector D. Also, when the armature is attracted, the end 103 presses the latch 100 out of engagement with the spring 102, thus allowing the locked springs 102 and 101 to disengage and return to normal position. The release relay 65 of the selector C also energizes and places the springs 192 and 193 in contact, whereby an energizing circuit is closed through the release magnet 64 at the selector C. This circuit extends from ground through the springs 193 and 192 to the relay 64, to the battery lead 139, and through battery B to ground G. The release magnet 64 operates to press the latch $31^a$ out of engagement with the spring $32^a$, and to restore the first-selector shaft 34 to normal position.

The busy release of the connector E follows as a result of the deenergization of the rotary line relay 109, if the called line is busy. If, when the private magnet 114 deenergizes for the last digit, the called line is busy a ground impulse is transmitted from the shaft wiper 107 to the side switch wiper 119, contact point 194 through the springs 195 and 196 to the release magnet 120, thence to the battery lead 139, and through battery B to ground G. The release magnet, upon energizing, releases the connector switch shaft and restores the connector side switch to its first position, returning the vertical magnet to the control of the vertical line relay 108; therefore, if the calling subscriber (Fig. 1) now presses the signaling button 31 and energizes the vertical line relay 108, the latter now operates the vertical magnet 110. The vertical magnet in turn so raises the switch-shaft that the normal post 126 permits the switch shaft spring 127 to engage the contact point 128, and a busy signaling current is sent to the calling subscriber's station. The calling subscriber, upon hearing the busy-signal, will understand that the desired line is in service, and will release the switching apparatus over the same circuits previously described. The functions of the relay 63 of the selector C and the relay 95 of the selector D are to release before the side switch has passed to third position. Suppose that in making a call the selector C has been operated and established connection with the selector D, and that it is desired to release the selector C and make a new call. In that event, when the subscriber restores the receiver 2 to the switch-hook 3 and separates the line conductors 27 and 28, the energizing circuit through the rotary relay 90 is then broken, and the springs 91 and 93 separate, whereby the circuit through the release relay 95 also becomes broken. The springs 102 and 99, which are locked in contact, now engage the spring 101, whereby an energizing circuit is completed through the release magnet 77 of the selector D in series with the release relay 65 of the selector C. This circuit extends from ground $G^9$ through the release relay 65, shaft wiper 37, through the springs 102, 99 and 101, side switch 83, contact point 197 to the release magnet 77, thence to the battery lead 139, and through battery B to ground G. The release magnet operates, as before, to release the selector D, and the release relay 65 energizes and closes a circuit through the release magnet 64, as above. Similarly, the selector C may be released while the side switch is in first or second position by the breaking of the energizing circuit through the rotary line relay 61, thus permitting the springs 140 and 141 to disengage, whereby the circuit through the private magnet 43 and release relay 63 is also broken. The locked springs 142 and $32^a$ engage the spring 143, thus closing a circuit through the release magnet 64. This circuit extends from ground $G^{14}$ through the springs $32^a$, 142 and 143, side switch wiper 42, contact point 53 to the release magnet 64, thence to the battery lead 139, and through battery B to ground G.

The relay 63 may be wound to any suitable resistance, but good results have been obtained when said relay is wound to a resistance of twenty-three hundred ohms; the release relay 95 may be wound to a resistance of twenty-three hundred ohms; the vertical line relays 59, 89 and 108 to five hundred ohms; the rotary line relays 61, 90 and 109 to five hundred ohms; and the substation resistance coil 29 to three thousand ohms.

From the foregoing it will be seen that by my invention I provide improved means for controlling a plurality or series of automatic step-by-step switches without employing operating grounds at the substations. In other words, I employ a series of switches for trunking a calling subscriber into connection with a called subscriber's line, and do so by improved means comprising line circuits including both sides of the line in series, no grounds being necessary outside of the central station or exchange for controlling the trunking switches and connectors. In this way the subscribers' telephone lines are free from operating grounds outside of the exchange or central station, and all line circuits employed for controlling the exchange apparatus are of an entirely metallic character and do not include the ground. The advantages accruing from the use of nongrounded telephone lines and substations are many, and will be obvious to those skilled in the art.

What I claim as my invention is:

1. A telephone exchange system comprising a telephone line, an automatic switch provided with a switch shaft supported for both endwise and rotary motion, means for closing the two sides of the line together to move the shaft endwise, means including a line relay responsive to such closing of the line for giving the shaft a step-by-step endwise motion, suitable means for rotating the shaft after it has been moved endwise, means for cutting off the line relay while the shaft is in its rotated position, and means for restoring the shaft to normal position by the opening of the line.

2. A telephone exchange system comprising a telephone line, an automatic switch provided with a bank of contacts arranged in a plurality of levels, a rotary switch shaft adapted to be raised to any one of said levels, a subscriber's device for closing together the two sides of the line, means including a line relay responsive to the closing of the line for raising the switch shaft, adapted to step the latter up to any level, according to the number of times the line is closed, means for automatically rotating the shaft at any level to find an idle contact therein, means for cutting off the line relay while the shaft is in its rotated position, and means for restoring the switch shaft to normal position by the opening of the line.

3. A telephone exchange system comprising a subscriber's telephone line, an automatic switch provided with a rotary and endwise movable switch shaft, a line relay for controlling the endwise movements of said shaft, means including another line relay for controlling the rotation of the shaft, line circuits for energizing said relays, and means for cutting off said relays while the shaft is in its rotated position, each line circuit including the two sides of the telephone line in series.

4. A telephone exchange system comprising a subscriber's telephone line including a pair of talking conductors, an automatic switch, a rotatable calling device adapted by its backward rotation to intermittently close together the two talking conductors of the telephone line, a line relay in said switch for responding to the intermittent closing of the line, means for thereafter cutting off said relay, and means for restoring the switch to normal position by opening the line.

5. A telephone exchange system comprising a calling telephone line, a called telephone line, a progressively movable selector and connector for establishing a talking circuit between said lines, a source of ringing current, a relay adapted when energized to bridge the source of ringing current across the called subscriber's line, an energizing circuit for said relay, a second relay for controlling said energizing circuit, a line circuit for said second relay, a subscriber's device for closing said line circuit, said line circuit including the two sides of the calling line in series, a release magnet for said connector, a circuit for said magnet separate from the talking circuit and extending from the selector to the connector, and a third or trunk release relay for controlling said release circuit.

6. A telephone exchange system comprising a calling telephone line, a called telephone line, trunk lines including a pair of talking conductors and a separate release conductor, automatic switches for uniting said trunk lines to establish a connection between said telephone lines, means for signaling the called subscriber by closing together the two sides of the calling line after the said telephone lines are connected together, apparatus for releasing said switches, and a circuit including said release conductor and extending from one switch to another for operating said apparatus.

7. A telephone exchange system comprising telephone lines each including a pair of talking conductors, automatic connectors less in number than said telephone lines, selectors less in number than the telephone lines, subscribers' individual switches corresponding in number to the telephone lines, subscribers' devices for closing together the two sides of the lines to control said individual switches and selectors and connectors, line circuits by which the said individual switches and selectors and connectors are controlled to establish a talking circuit between two of said telephone lines, each line circuit including said pair of talking conductors of a calling telephone line in series, and means including release trunks separate from the talking circuit and extending respectively from said individual switches to said selectors and from said selectors to said connectors for restoring said individual switches and selectors and connectors by the opening of the calling lines.

8. A telephone exchange system comprising a second selector, a pair of talking conductors extending thereto, and a battery having one pole grounded, said selector provided with a vertical line relay permanently connected to nongrounded battery, with a rotary line relay permanently connected to grounded battery, said relays normally bridged across said talking conductors, and with means for disconnecting said relays from said talking conductors.

9. A telephone exchange system comprising a pair of talking conductors and a rotary line relay normally connected to one of said conductors, an energizing circuit for said relay, means for disconnecting said relay from said conductor, means for causing short interruptions in the energizing circuit of said relay, and a slow-acting relay adapted to energize when the said line relay is energized, and adapted to remain energized during the short interruptions in the energizing circuit of the said line relay.

10. A telephone exchange system comprising a selector provided with a side switch, a trunk line including a pair of talking conductors leading to said selector, a circuit including said talking conductors in series for controlling the operation of said selector, a release relay for releasing said selector while the side switch is in first or second position, and a release relay for releasing the said selector when the side switch is in third position.

11. A telephone exchange system comprising a release relay provided with three springs, and a catch on one of said springs adapted to lock the other two of said springs together when the release relay energizes, a side switch wiper connected with one of the springs, a trunk release conductor, a selector having a private wiper, said trunk release conductor connecting another of said springs with said private wiper, said catch causing the locked pair of springs to be brought into electrical connection with the third spring when the release relay de-energizes to place the side switch wiper in electrical connection with the said trunk release conductor.

12. A telephone exchange system wherein the subscribers' lines each include a pair of talking conductors and wherein the central office apparatus is controlled over circuits including the said talking conductors in series, a selector and a trunk release conductor leading thereto, a back release relay for the selector, a second selector, a release magnet therefor, said second selector provided with a side switch, and a release relay for connecting the release magnet with the said trunk release conductor and back release relay while the side switch of the second selector is in first or second position to cause the release of the selectors while the side switch of the second selector is in first or second position.

13. A telephone exchange system comprising a selector provided with a side switch, a release relay provided with a pair of springs, means for locking said springs together, a release magnet, a rotary line relay, a switch shaft adapted to be raised step by step, a pair of springs adapted to be operated by said shaft, an armature for said release magnet, said armature adapted to unlock the release relay springs when the release magnet energizes, and a private magnet adapted to be energized by the rotary line relay after the switch shaft is raised one step to close the shaft-controlled springs and only while the said side switch is in first position.

14. A telephone exchange system wherein a pair of talking conductors lead to an automatic switch, a switch shaft, a rotary line relay normally connected to one of said talking conductors, means for disconnecting said relay from said talking conductor, a private magnet, and an energizing circuit for said private magnet controlled by said switch shaft and rotary line relay, said shaft provided with means for raising and rotating it, means operated by said shaft and relay for setting up the said circuit while the rotary line relay is energized and the switch shaft out of normal vertical position but in normal rotary position, said energizing circuit when established adapted to be broken either by the rotation of the shaft, by the deenergizing of the rotary line relay, or by both.

15. A telephone exchange system comprising a first selector, a second selector provided with a side switch, a trunk line including a pair of talking conductors leading to said second selector, a rotary line relay normally connected to one of said talking conductors, means for disconnecting said relay from said talking conductor, and means for energizing said relay after the first selector extends connection to the second selector adapted to maintain the relay energized as long as the side switch of the second selector remains in first or second position.

16. A telephone exchange system comprising a second selector provided with a vertical side switch wiper, a vertical line relay, a vertical line wiper, a trunk conductor adapted to be switched by the switch wiper from the vertical line relay to the vertical line wiper, a rotary side switch wiper, a rotary line relay, a rotary line wiper, a rotary trunk conductor adapted to be switched by the rotary side switch wiper from the rotary line relay to the rotary line wiper, a rotary magnet, a side switch wiper for closing circuit through the rotary magnet while the side switch is in second position, a private magnet, a side switch wiper adapted to close circuit through the private magnet to lock the side switch in second position and to maintain circuit through the rotary magnet, a private wiper, bank contacts adapted to be engaged by said private wiper, said energizing circuit maintained through the rotary magnet adapted to be opened as soon as the private wiper passes out of engagement with busy bank contacts, a release magnet, a release relay spring, and a side switch wiper for maintaining the release magnet in connection with the said release relay spring while the said switch is in first or second position, adapted for breaking such connection between the release magnet and the release relay spring when the side switch passes to third position.

17. A telephone system comprising a second selector provided with a private magnet, a switch shaft and springs controlled thereby, a rotary line relay, a back release relay, a private wiper, and a side switch provided with a switch wiper, said private magnet having a plurality of energizing circuits whereof one is controlled by the shaft controlled springs and the rotary line relay, another of said circuits being controlled by the private magnet itself and including said switch wiper and back-release relay and the private wiper.

18. A telephone system comprising a battery having one pole grounded, a connector provided with a rotary line relay having one terminal thereof permanently connected to ground, a vertical line relay having one terminal thereof permanently connected to the non-grounded terminal of the battery, a trunk line including a pair of talking conductors and a separate conductor leading to said connector, a selector for establishing connection with said three conductors, a magnet for releasing said connector, and a circuit including said separate conductor and extending from said selector to said connector for operating said magnet.

19. A telephone system comprising a second selector, a connector, a trunk line including a pair of talking conductors and a separate conductor leading to said connector, a line relay for controlling the operation of said connector to extend a connection therefrom, a circuit including said pair of talking conductors in series for energizing said line relay, means for closing said circuit as soon as the selector seizes said trunk line, a magnet for releasing said connector, and a circuit including said separate conductor extending from said selector to said connector for operating said magnet.

20. A telephone system wherein the trunk lines extending between the automatic switches each include a pair of talking conductors and a separate conductor, a rotary line relay, a pair of line conductors, a substation high resistance coil, a vertical line relay, a circuit for energizing said rotary line relay, said circuit including said line conductors, said resistance coil, and said vertical line relay, the resistance of said circuit being adjusted to permit the operation of the rotary line relay and prevent the operation of the vertical line relay, means for short circuiting or shunting the resistance coil to operate the vertical line relay, mechanisms for releasing said switches, circuits each including one of said separate conductors and extending from one of said switches to another for operating said mechanisms.

21. An automatic telephone exchange system comprising a connector provided with a rotary line relay, a trunk line including a pair of talking conductors and a separate conductor leading to said connector, a selector for establishing connection with said three conductors; a slow-acting release relay adapted to energize when the said rotary line relay is energized, a magnet for releasing said connector, and a circuit including said separate conductor and extending from said selector to said connector for operating said magnet.

22. An automatic telephone exchange system comprising a connector provided with a rotary line relay, a slow-acting relay, an energizing circuit for the slow acting relay, said slow acting relay being provided with springs, and means for locking said springs together when the slow acting relay is energizing, said slow acting relay adapted to remain energized during short interruptions of the energizing of the said rotary line relay.

23. An automatic telephone exchange system comprising a connector and means for seizing said connector, the said connector being provided with a slow acting relay adapted to remain energized from the time the connector is seized until the calling subscriber releases, a rotary line relay, means for deenergizing said rotary line relay when the calling subscriber releases, means by which the deenergizing of said rotary line relay causes the deenergizing of said slow acting relay, a release magnet, a beveled stop, said slow acting relay provided with three springs and with a latch for momentarily uniting said springs in electrical contact, said latch adapted to strike said stop when said slow acting relay is deenergized, a release magnet and an energizing circuit therefor adapted to be opened by the separation of two of said springs, substantially as set forth.

24. A telephone exchange system comprising a private magnet, a vertical line relay, a rotary line relay, and a locking energizing circuit for the private magnet adapted to be set up by the vertical line relay and adapted to be broken down by the rotary line relay.

25. A telephone exchange system comprising a vertical line relay, a rotary line relay, a side switch, and a locking energizing circuit adapted to be set up by the vertical line relay while the side switch is in first or second position and adapted to be broken by the rotary line relay.

26. A telephone system comprising a private magnet, a side switch and private wiper, a rotary line relay and a release magnet, a circuit for initially energizing said private magnet, a locking circuit for said private magnet controlled by said rotary line relay, a couple of energizing circuits for said release magnet, one of which circuits is controlled by the private magnet adapted to be set up while the side switch is in second position and the private wiper on a grounded contact point at the instant that the rotary line relay breaks the locking circuit of the private magnet.

27. A telephone system comprising a vertical line relay, a side switch, a rotary magnet controlled by the vertical line relay while the side switch is in second position, a shaft and shaft wipers rotated thereby in a step by step manner, a private wiper, a release magnet, an energizing circuit therefor, established while the side switch is in second position, comprising private magnet springs, and adapted to be established whenever the private wiper stops upon a grounded contact point, and a locking energizing circuit for the private magnet adapted to be established by the vertical line relay upon its first operation, after the side switch passes to second position, in order to maintain the said private springs separated, and to prevent the establishment of the said release magnet energizing circuit while the private wiper is being rotated.

28. A telephone system comprising a connector side switch, vertical and rotary line relays for operating said side switch, and a private magnet, said side switch controlled by the private magnet and adapted to shift from first to second position and from second to third position, the shift from first to second position produced by the vertical line relay energizing the private magnet and locking the latter, and by the rotary line relay subsequently breaking down the said locking circuit, the shift from second to third position produced by the vertical line relay again energizing and locking the private magnet, and by the rotary line relay subsequently breaking down the locking circuit.

29. A telephone system comprising a vertical line relay, a vertical magnet, and a private magnet combined to energize together.

30. A telephone system comprising a selector, a side switch therefor, another selector for extending connection to said first mentioned selector, a rotary line relay for said first mentioned selector adapted to energize as soon as the first mentioned selector is seized, a slow acting release relay energized thereby, said slow acting release relay remaining in readiness to release said selectors if the subscriber should desire to do so before said side switch passes to third position.

31. A telephone system comprising trunk-selectors provided with line relays, means for cutting off said relays, connectors provided with permanently bridged line relays, a battery permanently connected in series between the relays of the connectors, trunk-release circuits for the selectors controlled by the connectors, telephone lines, and line circuits for successively controlling one or more of said trunk-selectors and a connector to extend connection to a called telephone line, each circuit including the two sides of a calling telephone line in series, and means for releasing the selectors and connectors by the opening of a connected telephone line.

32. A telephone system comprising trunk-selectors, line relays for said selectors, operating circuits controlled by said relays, means for cutting off said line relays, automatic connectors, line relays for said connectors, circuits controlled by said last-mentioned relays for controlling the operation thereof to extend connection therefrom, a source of operating current, said source of current normally bridged between the relays of the connectors, metallic line circuits for controlling the said relays, and trunk-release circuits for the selectors controlled by the connectors.

33. A telephone exchange system comprising telephone lines each including a pair of talking conductors, automatic connectors less in number than said telephone lines, provided with means having vertical motion from one operative level to another to select groups or divisions of the exchange, and rotary motion in any selected level to connect with a line therein, selectors less in number than the telephone lines, subscribers' individual switches corresponding in number to the telephone lines, subscribers' devices for closing together the two sides of the lines to control said individual switches and selectors and connectors, line circuits by which the said individual switches and selectors and connectors are controlled to establish a talking circuit between two of said telephone lines, each line circuit including said pair of talking conductors of a calling telephone line in series, and means including release trunks separate from the talking circuit and extending respectively from said individual switches to said selectors and from said selectors to said connectors for restoring said individual switches and selectors and connectors by the opening of the calling line.

34. A telephone exchange system comprising a second-selector, a pair of talking conductors extending thereto, and a battery having one pole grounded, said selector provided with means having vertical motion from one operative level to another to select groups or divisions of the exchange, and rotary motion in any selected level to connect with a line therein, and provided also with a vertical line relay permanently connected to nongrounded battery, with a rotary line relay permanently connected to grounded battery, said relays normally bridged across said talking conductors, and means for disconnecting said relays from said talking conductors.

35. A telephone exchange system comprising a selector provided with means having vertical motion from one level to another to select groups or divisions of the exchange, and rotary motion in any selected level to connect with a line therein, and provided also with a side switch, a trunk line including a pair of talking conductors leading to said selector, a circuit including the said talking conductors in series for controlling the operation of said selector, a release relay for releasing said selector while the side switch is in first or second position, and a release relay for releasing the said selector when the side switch is in third position.

36. A telephone exchange system comprising a selector provided with means having vertical motion from one operative level to another to select groups or divisions of the exchange and rotary motion in any selected level to connect with a line therein and provided also with a side switch, a release relay provided with a pair of springs, means for locking said springs together, a release magnet, a rotary line relay, a switch shaft adapted to be raised step by step, a pair of springs adapted to be operated by said shaft, an armature for said release magnet said armature adapted to unlock the release relay springs when the release magnet energizes, a private magnet adapted to be energized by the rotary line relay after the switch shaft is raised one step to close the shaft controlled springs, and only while the said side switch is in first position.

37. A telephone exchange system comprising a first selector, a second selector provided with means having vertical motion from one operative level to another to select groups or divisions of the exchange and rotary motion in any selected level to connect with a line therein, and provided also with a side switch, a trunk line including a pair of talking conductors leading to said second selector, a rotary line relay normally connected to one of said talking conductors, means for disconnecting said relay from said talking conductor, and means for energizing said relay after the first selector extends connection to the second selector adapted to maintain the relay energized as long as the side switch of the second selector remains in first or second position.

38. A telephone system comprising a battery having one pole grounded, a connector provided with means having vertical motion from one level to another to select groups or divisions of the exchange, and rotary motion in any selected level to connect with a line therein, and provided also with a rotary line relay having one terminal thereof permanently connected to ground, a vertical line relay having one terminal thereof permanently connected to the non-grounded terminal of the battery, a trunk line including a pair of talking conductors, and a separate conductor leading to said connector, a selector for establishing connection with said three conductors, a magnet for releasing said connector, and a circuit including said separate conductor and extending from said selector to said connector for operating said magnet.

39. A telephone system comprising a second selector, a connector provided with means having vertical motion from one level to another to select groups or divisions of the exchange and rotary motion in any selected level to connect with a line therein, a trunk line including a pair of talking conductors and a separate conductor leading to said connector, a line relay for controlling the operation of said connector to extend a connection therefrom, a circuit including said pair of talking conductors in series for energizing said line relay, means for closing said circuit as soon as the selector seizes said trunk line, a magnet for releasing said connector, and a circuit including said separate conductor and extending from said selector to said connector for operating said magnet.

40. An automatic telephone exchange system comprising a connector provided with means having vertical motion from one operative level to another to select groups or divisions of the exchange, and rotary motion in any selected level to connect with a line therein, and provided also with a rotary line relay, a trunk line including a pair of talking conductors and a separate conductor leading to said connector, a selector for establishing connection with said three conductors, a slow-acting release relay adapted to energize when the said rotary line relay is energized, a magnet for releasing said connector, and a circuit including said separate conductor and extending from said selector to said connector for operating said magnet.

41. An automatic telephone exchange system comprising a connector provided with means having vertical motion from one operative level to another to select groups or divisions of the exchange, and rotary motion in any selected level to connect with a line therein, and provided also with a rotary line relay, a slow-acting relay, an energizing circuit for the slow-acting relay, said slow-acting relay being provided with a pair of springs, and means for locking said springs together when the slow-acting relay is energizing, said slow-acting relay adapted to remain energized during short interruptions of the energizing of the said rotary line relay.

42. An automatic telephone exchange system comprising a connector, means for seizing said connector, the said connector being provided with means having vertical motion from one operative level to another to select groups or divisions of the exchange, and rotary motion in any selected level to connect with a line therein, and also provided with a slow-acting relay adapted to remain energized from the time the connector is seized until the calling subscriber releases, a rotary line relay, means for deenergizing said rotary line relay when the calling subscriber releases, means by which the deenergizing of said rotary line relay causes the deenergizing of said slow-acting relay, a release magnet and a beveled stop, said slow-acting relay provided with three springs and with a latch for momentarily uniting said springs in electrical contact, said latch adapted to strike said stop when said slow-acting relay is deenergized, a release magnet and an energizing circuit therefor adapted to be opened by the separation of two of said springs.

43. A telephone system comprising automatic trunk-selectors, automatic connectors provided with means having vertical motion from one level to another to select groups or divisions of the exchange, and rotary motion in any selected level to connect with a line therein, trunk lines each including a pair of talking conductors leading to said connectors, trunk-release circuits for the selectors controlled by the connectors, a variably rotative calling dial at each substation, a source of operating current, said connectors each provided with one or more permanently bridged line relays permanently connected with said source of current, and circuits each including a pair of said talking conductors in series for energizing said line relays to control the said connectors in their group selecting and line connection operations.

44. In a telephone exchange trunking system, a telephone line, an automatic switch provided with a bank of contacts arranged in a plurality of levels, and with a rotary switch shaft adapted to be raised to any one of said levels in accordance with a digit of the called number, a subscriber's device for closing together the two sides of the line, adapted to come to rest before actuation thereof to transmit impulses for the next digit, means including a line relay responsive to the closing of the line for raising the switch shaft, adapted to step the latter up to any level, according to the number of times the line is closed, means for automatically rotating the shaft at any level to find an idle contact therein, means for cutting off the line relay while the shaft is in its rotated position, and means for restoring the switch shaft to normal position by the opening of the line.

45. In a telephone exchange trunking system, a subscriber's telephone line, an automatic switch provided with a rotary and endwise-movable switch shaft, a line relay for controlling the endwise movements of said shaft, means including another line relay for controlling the rotation of the shaft, line circuits for energizing said relays, means for cutting off said relays while the shaft is in its rotated position, each line circuit including the two sides of the telephone line in series, and a calling mechanism for controlling said circuits, adapted to come to rest upon the completion of the endwise motion of said shaft.

46. In a telephone exchange trunking system, a subscriber's telephone line, an automatic switch provided with a rotary and endwise-movable switch shaft, another automatic switch, a trunk line including a pair of talking conductors and a separate conductor leading from said first switch to said other switch, means including a line circuit for controlling the rotation of the shaft to seize said trunk line, each line circuit including the two sides of the telephone line and said pair of talking conductors all in series, means for controlling said circuits adapted to return to normal upon the completion of the endwise movement of said shaft, release mechanism for said first switch, and a circuit including said separate conductor and controlled by said other switch for operating said mechanism.

47. In a telephone exchange trunking system, telephone lines each including a pair of talking conductors, automatic connectors less in number than said telephone lines, selectors less in number than the telephone lines, subscriber's individual switches corresponding in number to the telephone lines, subscribers' devices for closing together the two sides of the lines to control said individual switches and selectors and connectors, each device adapted to come to rest after one digit and before calling the next digit, line circuits by which the said individual switches and selectors and connectors are controlled to establish a talking circuit between two of said telephone lines, each line circuit including the two sides of a calling telephone line in series, and means including release trunks separate from the talking circuit and extending respectively from said individual switches to said selectors and from said selectors to said connectors for restoring said individual switches and selectors and connectors by the opening of the calling line.

48. In a telephone trunking system, trunk-selectors, line relays for controlling said selectors, means for cutting off said line relays, automatic connectors, line relays for said connectors, a source of operating current, said source of current normally bridged between the relays of the connectors, trunk-release circuits for the selectors controlled by the connectors, and means for controlling said relays adapted to come to rest after each separate operation thereof for each digit of the called number.

49. In an automatic telephone exchange system employing bridging line relays, a calling telephone line, a called telephone line, a series of automatic switches for extending connection from the calling line to the called line, having provisions for automatically reducing the number of bridges across the talking circuit during the establishment thereof, three-conductor trunks between said switches, and a plurality of line circuits by which said switches are successively controlled, each said line circuit including the two sides of the calling line in series.

50. In a telephone exchange system employing bridging line relays, a calling telephone line, a called telephone line, means including a plurality of selectors and a connector for extending connection from the calling line to the called line, having provisions for automatically reducing the number of bridges across the talking circuit during the establishment thereof, three-conductor trunks between said switches, line circuits for controlling the selectors, and line circuits for controlling the connector, each line circiut including the two sides of the calling line in series.

51. In a telephone exchange system employing bridging line relays, a subscriber's telephone line, an automatic switch provided with a rotary and endwise-movable switch shaft, having provisions for automatically reducing the number of bridges across the talking circuit during the establishment thereof, means including a line circuit for controlling the endwise movements of the switch shaft, means including a line circuit for controlling the rotation of the shaft, and a trunk-release circuit for restoring said switch, each line circuit including the two sides of the telephone line in series.

52. In a telephone system employing bridging line relays, a line, a plurality of electrically-propelled and step-by-step actuated switches having provisions for automatically reducing the number of bridges across the talking circuit during the establishment thereof, three-wire connections between said switches, line circuits for successively controlling said switches, and a subscriber's device for intermittently closing together the two sides of the line to establish said circuits, each line circuit including the two sides of the line in series.

53. In a telephone exchange system employing bridging line relays, telephone lines, automatic connectors less in number than said telephone lines, selectors less in number than the telephone lines, having provisions for automatically reducing the number of bridges across the talking circuit during the establishment thereof, subscribers' individual switches corresponding in number to the telephone lines, subscribers' devices for closing together the two sides of the lines to control said individual switches and selectors and connectors, line circuits by which the said individual switches and selectors and connectors are controlled, each line circuit including the two sides of a calling telephone line in series, and means including release trunks for restoring said individual switches and selectors and connectors by the opening of the calling lines.

54. In a telephone system employing bridging line relays, subscribers' telephone lines, automatic means for trunking a calling line into connection with a called line, having provisions for automatically reducing the number of bridges across the talking circuit during the establishment thereof, including three-wire trunks, and successive line circuits for controlling said automatic trunking means, each line circuit including the two sides of the calling telephone line in series.

55. In a telephone system employing bridging line relays, trunk selectors having provisions for automatically reducing the number of bridges across the talking circuit during the establishment thereof, line relays for controlling said selectors, means for cutting off said line relays, automatic connectors, line relays for said connectors for controlling the operation thereof to extend connection therefrom, a source of operating current, said source of current normally bridged between the relays of the connectors, and trunk-release circuits for the selectors controlled by the connectors.

56. An automatic telephone exchange system comprising subscribers' lines, a series of automatic switches for trunking a calling subscriber's line into connection with a called subscriber's line, a bridge containing an operating element and a bridge cut-off relay for each subscriber's line, trunk lines each including a pair of talking conductors and a separate conductor between said switches, circuits each including a pair of said talking conductors in series for operating said switches, means independent of the earth at the calling subscriber's station for controlling said circuits, a magnet for releasing the final one of said series of switches, and a circuit including said separate conductor of one of said trunk lines for operating said magnet.

57. An automatic telephone exchange system comprising a calling telephone line including a pair of talking conductors, a called telephone line, a series of automatic switches for extending connection from the calling line to the called line, a bridge containing an operating element and a bridge cut off relay for each telephone line, trunk lines, each including a pair of talking conductors and a separate conductor between said switches, a plurality of line circuits by which said switches are successively controlled, each said line circuit including said pair of talking conductors of the calling line in series, a magnet for releasing the final one of said series of switches, and a circuit including said separate conductor of one of said trunk lines for operating said magnet.

58. A telephone exchange system comprising a calling telephone line including a pair of talking conductors, a called telephone line, means including a plurality of selectors and a connector for extending connection from a calling line to a called line, a bridge containing an operating element and a bridge cut off relay for each telephone line, trunk lines each including a pair of talking conductors and a separate conductor between said switches, a plurality of line circuits for controlling each of said selectors, a plurality of line circuits for controlling said connector, each of said line circuits including said pair of talking conductors of the calling line in series, a magnet for releasing said connector, and a circuit including said separate conductor of one of said trunk lines for operating said magnet.

59. A telephone exchange system comprising a calling telephone line including a pair of talking conductors, a called telephone line, a connection between said lines, automatic switches for establishing said connection, a bridge containing an operating element and a bridge cut-off relay for each telephone line, a trunk line including a pair of talking conductors and a separate conductor between said switches, means for signaling the called subscriber by closing together said pair of talking conductors of the calling line after the two lines are connected together, a magnet for releasing one of said switches, and a circuit including said separate conductor for operating said magnet.

60. A telephone exchange system comprising telephone lines each including a pair of talking conductors, a bridge containing an operating element and a bridge cut off relay for each telephone line, automatic connectors less in number than said telephone lines, selectors less in number than the telephone lines, subscribers' individual switches corresponding in number to the telephone lines, trunk lines each including a pair of talking conductors and a separate conductor, some of said trunk lines extending between said selectors and connectors and other of said trunk lines extending between said individual switches and selectors, subscribers' devices for closing together said pair of talking conductors of the telephone lines to control said individual switches and selectors and connectors, line circuits by which said individual switches and selectors and connectors are controlled, each line circuit including said pair of talking conductors of a calling telephone line in series, and means including release circuits for restoring said individual switches and selectors and connectors by the opening of said pair of talking conductors of the calling line, each said release circuit including said separate conductor of one of said trunk lines.

61. In a telephone system a called telephone line, an automatic switch, a trunk line including a pair of talking conductors leading thereto, means for making connection to said trunk line, means for controlling said pair of talking conductors in series to control said switch to connect with said called line, said switch having a controlling magnet connected to one of said talking conductors, and means whereby said magnet is disconnected from said talking conductor during the use of the latter for talking purposes.

62. In a telephone system, a switch, means including a release magnet and a release magnet circuit for releasing the same, a slow-acting relay controlling the release magnet circuit throughout the operation of the switch, and a quick acting relay directly controlling the release magnet circuit independently of said slow-acting relay after the switch has operated.

63. In a telephone system, a pair of lines, a pair of automatic progressively movable switches operable successively for trunking from one line to another for setting up a connection between said lines, release means for breaking the connection at each switch, quick relays and slow relays in the system for controlling said release means, and means controlled solely through the medium of said quick acting relays for operating said release means to break the connection.

64. In a telephone system, a switch, means for releasing the same including a relay slow to release controlling a release magnet during the entire setting operation of the switch, a line relay controlling said slow relay a quick acting relay controlling the release independently of said slow relay after the switch has operated, and means for controlling the two sides of a calling line in series to operate said switch.

65. In a telephone system, a trunk, a switch for extending connection thereto, releasing means for said switch including a slow-acting relay controlling the release continuously after the operation of the switch is started and until connection is extended to the trunk, and a quick acting relay controlled over the trunk for controlling the release after the switch has established the connection, and means for controlling the two sides of a calling line in series to operate said switch.

66. In a telephone system, a trunk, a switch for extending connection therefrom, releasing means for said switch including a release magnet and a relay slow to release its armature, said relay controlling the release magnet throughout the time the switch is operating, a quick-acting relay controlling the release magnet independently of said slow relay after connection has been established from the trunk, and means for controlling the two sides of a calling line in series to operate said switch.

67. In a telephone system, a trunk, a switch for selecting said trunk and for extending connection thereto, releasing means for said switch including a relay slow to release its armature, said relay controlling the release during the entire time the switch is operating to select said trunk, and a quick acting relay controlled over said trunk for controlling the release of said switch after connection has been established with said trunk.

68. In a telephone system, means including switches having selecting motions in two intersecting planes for establishing a calling connection, means for releasing the connection including release magnets, circuits for energizing said magnets, slow acting relays controlling the release circuits during the establishment of the call, and quick acting relays for controlling the release circuits during conversation independent of said slow acting relays.

69. In a telephone system, a switch, means for directively operating said switch in a primary movement and for automatically operating said switch in a secondary movement, a release magnet for restoring said switch, a slow-acting relay controlling said release magnet throughout the primary movement of said switch, and a quick acting relay controlling said release magnet independent of said slow acting relay after the secondary movement has been completed.

70. In a telephone system, a line terminating in an automatic switch, a line relay in said switch connected to said line for controlling the operation of said switch, a slow acting relay controlled by said line relay, a release magnet controlled by said slow relay while the switch is operating, means for disconnecting said line relay from the line as soon as the operation is completed, and a quick acting relay in said switch controlling said release magnet thereafter.

71. In a telephone system, a trunk, a switch for extending connection to said trunk, releasing means for said switch including a relay slow to release its armature, said relay controlling the release while the switch is operating and remaining de-energized after the trunk is connected with, and a quick acting relay controlled over said trunk for controlling the release of said switch after connection has been established with said trunk.

72. In a telephone system, a calling and a called line, a selector switch and a connector switch, means for controlling the selector over the calling line to select said connector and extend the calling line thereto, means for controlling said connector over the calling line to extend the connection to said called line, a release magnet in said selector, a slow acting relay controlling said release magnet throughout the selecting operation of said selector, and a quick acting relay controlling said release magnet independent of said slow relay after the calling line has been extended to said connector.

73. In a telephone system, a calling and a called line, a selector switch and a connector switch, means for controlling the selector over the calling line to select said connector and extend the calling line thereto, means for controlling said connector over the calling line to extend the connection to said called line, a release magnet in said selector, a slow acting relay controlling said release magnet throughout the selecting operation of said selector, a quick acting relay controlling said release magnet independent of said slow relay after the calling line has been extended to said connector, a circuit for said quick relay extending between the selector and connector, and means in the connector controlled by the calling subscriber for controlling said circuit.

74. In a telephone system, a calling and a called line, a train of serially related automatic switches for connecting said lines, means including a line relay in each switch for operating the same, a control circuit for each line relay including the two talking conductors of the calling line in series, means in each switch except the last for disconnecting its associated line relay from the calling line as soon as the switch is operated, trunk release circuits independent of the talking conductors for releasing all said switches except the last, and means in the final switch for controlling said release circuits.

75. In a telephone system, a calling and a called line, a selector switch having two line wipers and a test wiper, means including a line relay in said selector directively controlled over the two talking conductors of the calling line in series to operate the switch to extend a connection toward the called line, means for disconnecting the line relay from the line when the switch is operated, other switching mechanism then controlled over the two talking conductors of the calling line in series to complete the connection to the called line, the control circuit for said other switching mechanism including the line wipers of said selector, and a circuit for releasing said first selector including said test wiper.

Signed at Chicago, Illinois, this 26th day of August, 1920.

RAYMOND H. BURFEIND.